(12) United States Patent
Sakamoto et al.

(10) Patent No.: US 12,399,414 B2
(45) Date of Patent: Aug. 26, 2025

(54) OPTICAL DEFLECTOR AND METHOD FOR DETERMINING CONTROL CONDITION OF OPTICAL DEFLECTOR

(71) Applicant: Nippon Telegraph and Telephone Corporation, Tokyo (JP)

(72) Inventors: Takashi Sakamoto, Tokyo (JP); Masahiro Ueno, Tokyo (JP); Yuichi Akage, Tokyo (JP); Sohan Kawamura, Tokyo (JP); Yurina Tanaka, Tokyo (JP); Soichi Oka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 374 days.

(21) Appl. No.: 18/248,844

(22) PCT Filed: Oct. 14, 2020

(86) PCT No.: PCT/JP2020/038831
§ 371 (c)(1),
(2) Date: Apr. 12, 2023

(87) PCT Pub. No.: WO2022/079844
PCT Pub. Date: Apr. 21, 2022

(65) Prior Publication Data
US 2023/0393444 A1      Dec. 7, 2023

(51) Int. Cl.
*G02F 1/29* (2006.01)

(52) U.S. Cl.
CPC ........................ *G02F 1/29* (2013.01)

(58) Field of Classification Search
CPC ........................................................ G02F 1/29
See application file for complete search history.

(56) References Cited

U.S. PATENT DOCUMENTS

| | | | |
|---|---|---|---|
| 2006/0227410 A1 | 10/2006 | Segev et al. | |
| 2017/0358899 A1* | 12/2017 | Toyoda | H01S 5/143 |
| 2019/0302492 A1* | 10/2019 | Takizawa | G02F 1/0311 |
| 2020/0326564 A1* | 10/2020 | Takizawa | G02F 1/0327 |
| 2021/0191165 A1* | 6/2021 | Takizawa | G02F 1/0305 |

FOREIGN PATENT DOCUMENTS

| | | |
|---|---|---|
| JP | 2012242612 A | 12/2012 |
| JP | 6193773 B | 8/2017 |
| JP | 2017219732 A | 12/2017 |
| JP | 2019215462 A | 12/2019 |

* cited by examiner

*Primary Examiner* — Edmond C Lau
(74) *Attorney, Agent, or Firm* — Slater Matsil, LLP

(57) ABSTRACT

An optical deflector has a dielectric of a paraelectric phase and deflects light transmitted through the dielectric by applying a voltage in a direction perpendicular to a transmission direction of the dielectric, the optical deflector including, in order, a first temperature control element, a first conductor on which a first sensor is disposed, the dielectric, a second conductor on which a second sensor is disposed, and a second temperature control element, wherein a voltage is applied between the first conductor and the second conductor, the dielectric is irradiated with excitation light having a substantially uniform intensity in an application direction of the voltage, and a temperature of the first conductor and a temperature of the second conductor are set to predetermined temperatures.

15 Claims, 15 Drawing Sheets

OPTICAL DEFLECTOR AND METHOD FOR DETERMINING CONTROL CONDITION OF OPTICAL DEFLECTOR

CROSS-REFERENCE TO RELATED APPLICATIONS

This patent application is a national phase filing under section 371 of PCT application no. PCT/JP2020/038831, filed on Oct. 14, 2020, which application is hereby incorporated herein by reference in its entirety.

TECHNICAL FIELD

The present invention relates to an optical deflector using an electro-optic material and a method for determining a control condition of the optical deflector.

BACKGROUND

An optical deflector can change a traveling direction of light by applying a voltage and is used in various optical devices such as a laser printer and a wavelength-swept light source. Japanese Patent No. 6193773 ("PTL 1") discloses a wavelength-swept light source which includes an optical deflector using a KTN ($KTa_{1-x}Nb_xO_3$) crystal that is an electro-optic material and which is capable of operating stably for a long time. In the optical deflector using the KTN crystal, an internal electric field is generated by charge injection, and light can be deflected at a high speed and a wide angle.

In addition, Japanese Patent Application Publication No. 2017-219732 ("PTL 2") discloses a technique for shortening the time required for electron injection into a trap to reach a steady state by applying an AC voltage superimposed on a DC voltage to a KTN crystal in an optical deflector and irradiating the KTN crystal with excitation light.

As shown in FIG. 13, Japanese Patent Application Publication No. 2019-215462 ("PTL 3") discloses an optical deflector 90 having a temperature control mechanism together with a light irradiation mechanism. The optical deflector 90 is provided with sensors 906 and 907 on each of an anode-side metal block 902 and a cathode-side metal block 903, and a temperature is controlled by Peltier elements 908 and 909. Due to this temperature control, a temperature gradient in a KTN crystal 901 can be created and a gradient in dielectric constant can be provided. By performing optimization thereof, an instantaneous driving voltage dependency of a lens effect of the KTN crystal 901 can be suppressed. In other words, in the optical deflector 90 using the KTN crystal, a variation of an instantaneous value of a beam diameter of deflected light can be reduced.

CITATION LIST

Patent Literature

[PTL 1] Japanese Patent No. 6193773.
[PTL 2] Japanese Patent Application Publication No. 2017-219732.
[PTL 3] Japanese Patent Application Publication No. 2019-215462.

SUMMARY

Technical Problem

However, since a spatial distribution of excitation light irradiating an electro-optic material (for example, a KTN crystal) is not optimized, an optical deflector which sufficiently suppresses an instantaneous driving voltage dependency of a lens effect of the electro-optic material cannot be realized.

Solution to Problem

An optical deflector according to embodiments of the present invention has a dielectric of a paraelectric phase and deflects light transmitted through the dielectric by applying a voltage in a direction perpendicular to a transmission direction of the dielectric, and the optical deflector includes, in order: a first temperature control element; a first conductor on which a first sensor is disposed; the dielectric; a second conductor on which a second sensor is disposed; and a second temperature control element, wherein a voltage is applied between the first conductor and the second conductor, the dielectric is irradiated with excitation light having a substantially uniform intensity in an application direction of the voltage, and a temperature of the first conductor and a temperature of the second conductor are set to predetermined temperatures.

In addition, a method for determining a control condition of an optical deflector according to embodiments of the present invention is a method for determining a control condition of an optical deflector which has a dielectric of a paraelectric phase and which deflects light transmitted through the dielectric by applying a voltage in a direction perpendicular to a transmission direction of the dielectric, and the optical deflector includes, in order: a first temperature control element; a first conductor on which a first sensor is disposed; the dielectric; a second conductor on which a second sensor is disposed; and a second temperature control element. The method includes the steps of: irradiating the dielectric with excitation light having a substantially uniform intensity in an application direction of the voltage; setting a temperature of the first conductor and a temperature of the second conductor to predetermined temperatures; applying a voltage between the first conductor and the second conductor; measuring a beam diameter of emitted light of the optical deflector; and setting the temperature of the first conductor and the temperature of the second conductor so that a variation of the beam diameter due to instantaneous voltage dependency becomes equal to or less than a predetermined value.

Advantageous Effects of Embodiments of the Invention

According to embodiments of the present invention, it is possible to provide an optical deflector in which instantaneous driving voltage dependency of a lens effect is suppressed and a method for determining a control condition of the optical deflector.

DETAILED DESCRIPTION OF ILLUSTRATIVE EMBODIMENTS

First Embodiment

A first embodiment of the present invention will be described below with reference to FIGS. 1 to 3B.

Configuration of Optical Deflector

Figure 1A:
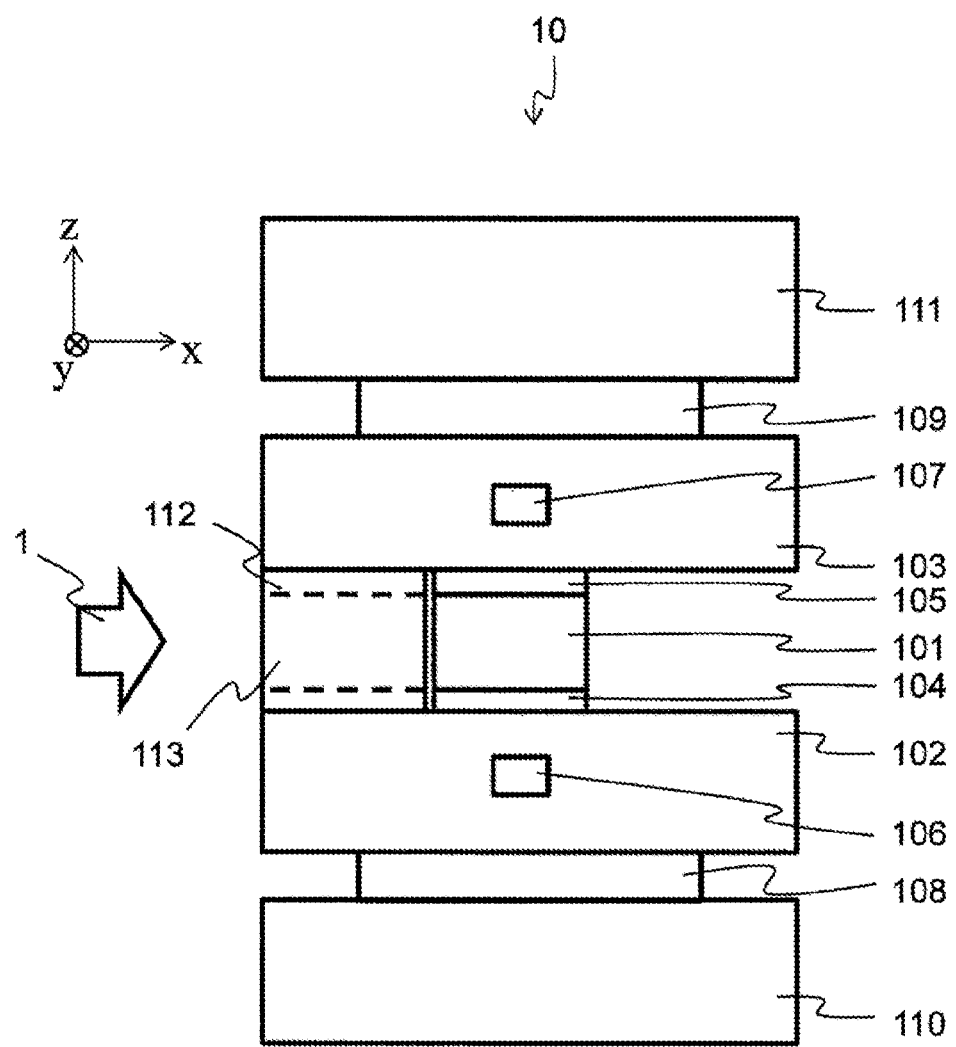
FIG. 1A is a front view showing a configuration of an optical deflector according to a first embodiment of the present invention.
Figure 1B:
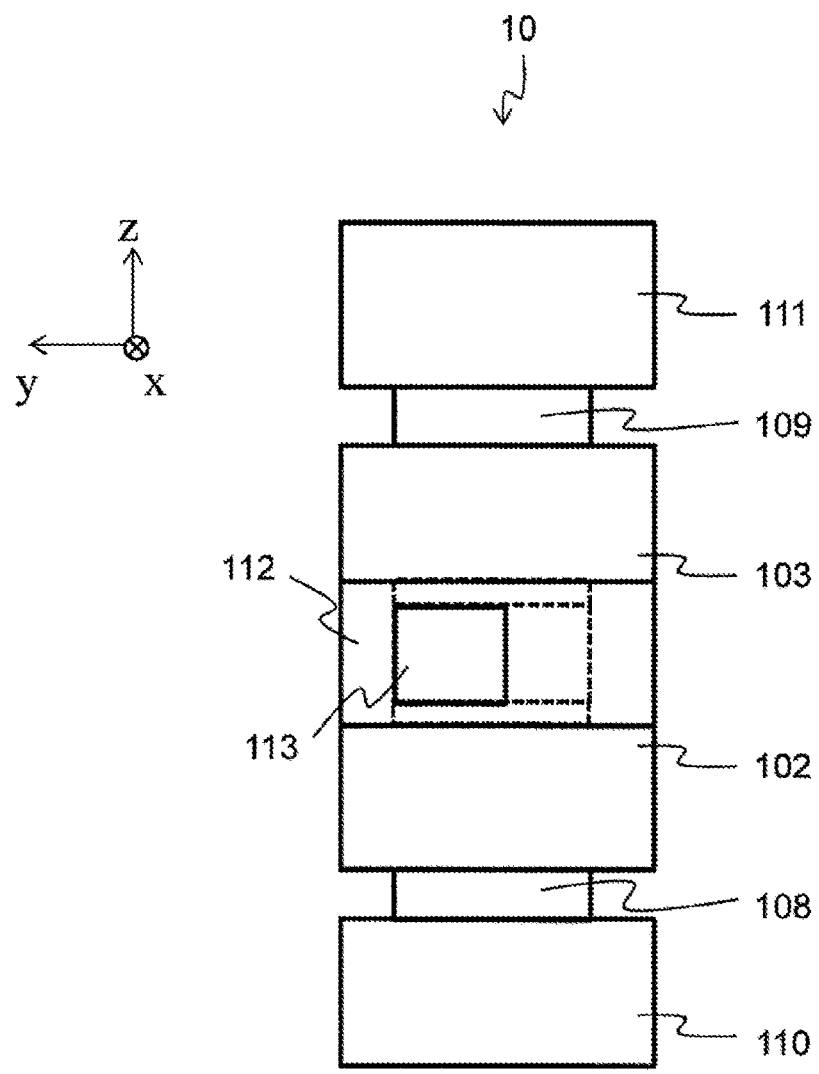
FIG. 1B is a side view showing a configuration of the optical deflector according to the first embodiment of the present invention.

As shown in FIGS. 1A and 1B, an optical deflector 10 according to the present embodiment comprises, in order, an anode-side metal block 102, a KTN crystal 101, and a cathode-side metal block 103, and further includes conductive elastic bodies 104 and 105 provided between the KTN crystal 101 and the anode-side metal block 102 and between the KTN crystal 101 and the cathode-side metal block 103, respectively.

In the optical deflector 10, light is incident on the KTN crystal 101 and transmitted therethrough in a y-direction in the drawing, and a voltage is applied between the anode-side metal block 102 and the cathode-side metal block 103 (in a z-direction in the drawing) to deflect the light. Here, a driving power source (not illustrated) is connected to each of the anode-side metal block 102 and the cathode-side metal block 103 and a voltage is applied thereto.

Further, in the optical deflector 10, an insulator 112 is disposed between the anode-side metal block 102 and the cathode-side metal block 103 on one side of the KTN crystal 101 and the conductive elastic bodies 104 and 105 or, in other words, in a direction perpendicular to a transmission direction of incident light (an x-direction in the drawing). There is a gap between the insulator 112 and the KTN crystal 101. Here, the insulator 112 may be disposed in contact with the KTN crystal 101.

The conductive elastic bodies 104 and 105 are arranged to prevent breakage of the KTN crystal 101 due to deformation when a voltage is applied, and a material that absorbs deformation of the KTN crystal 101 such as a carbon sheet is used.

The anode-side metal block 102 is provided with a temperature sensor 106, and a Peltier element (a temperature control element) 108 and a heat sink no are provided on a surface of the anode-side metal block 102 opposite to the side of the KTN crystal 101. Similarly, the cathode-side metal block 103 is provided with a temperature sensor 107, and a Peltier element (a temperature control element) 109 and a heat sink 111 are provided on a surface of the cathode-side metal block 103 opposite to the side of the KTN crystal 101.

Based on temperatures measured by the temperature sensors 106 and 107, a Peltier controller (a temperature control unit, not illustrated) controls the Peltier elements 108 and 109 to control the temperature.

Further, an excitation light source (not illustrated) is arranged to irradiate the KTN crystal 101 with excitation light 1.

The insulator 112 has a hole 113 for transmitting the excitation light 1. The insulator 112 is an electrical insulator, and the insulator 112 itself does not transmit the excitation light 1. A length of the hole 113 in a direction of an optical axis of the incident light (the y-direction) is shorter than a length of the KTN crystal 101 (in the y-direction), but the length of the hole 113 in the voltage application direction (the z-direction) is equal to or longer than a thickness of the KTN crystal 101 (the z-direction). Therefore, the excitation light 1 that radiates the KTN crystal 101 radiates the entire z-direction.

Operating Principle of Optical Deflector

The optical deflector 10 according to embodiments of the present embodiment will be described.

In the KTN crystal 101 in the optical deflector 10 according to embodiments of the present embodiment, an electric field is generated inside the KTN crystal 101 by the application of a voltage and electrons injected and accumulated in the KTN crystal 101, and a refractive index is changed. Therefore, incident light can be deflected by transmitting light (incident light) along an optical axis (y-axis) that is orthogonal to a direction of the electric field (z-direction) and applying an AC voltage on which a DC bias voltage has been superimposed. At this point, the KTN crystal 101 functions as a lens.

Assuming that an electric charge in the KTN crystal 101 is uniform, a focal length f in the lens function is represented by Expression (1).

Expression (1):

$$f = \frac{1}{n_0 \sqrt{A} \sin(L'\sqrt{A})} \quad (1)$$

Here, A is represented by Expression (2).

Expression (2):

$$A = n_0^2 g_{11} \rho^2 \quad (2)$$

In the Expressions, $n_0$ denotes a refractive index of the KTN crystal 101 when no voltage is applied, L' denotes a length of the KTN crystal 101 in an optical axis direction of incident light, $g_{11}$ denotes an electro-optic coefficient of the KTN crystal 101, and ρ denotes a charge density in the KTN crystal 101. Since L', $n_0$, and $g_{11}$ are constant in the KTN crystal 101, if ρ is a constant, then A is also constant according to Expression (2) and the focal length f is also constant and independent of instantaneous voltage according to Expression (1). In addition, a reciprocal of the focal length f is lens power.

Therefore, if the charge density ρ is constant in the KTN crystal 101, the focal length f becomes constant when light passes an arbitrary point in the KTN crystal 101.

Next, let us consider a case where the charge density is not necessarily constant in the KTN crystal 101.

In order to make the focal length f of a light beam emitted from the optical deflector constant and independent of a deflection angle, it is necessary to equalize the lens powers given by the KTN crystal 101 to the respective light beams. In order to equalize the lens powers, the lens powers given to the respective light beams may be equal at an arbitrary position in a direction of travel (y-direction) in the KTN crystal 101. For this purpose, the charge density need only be constant in the voltage application direction (z-direction) in the KTN crystal 101 and need not necessarily be constant in the direction of travel of light beams (y-direction).

Figure 2:
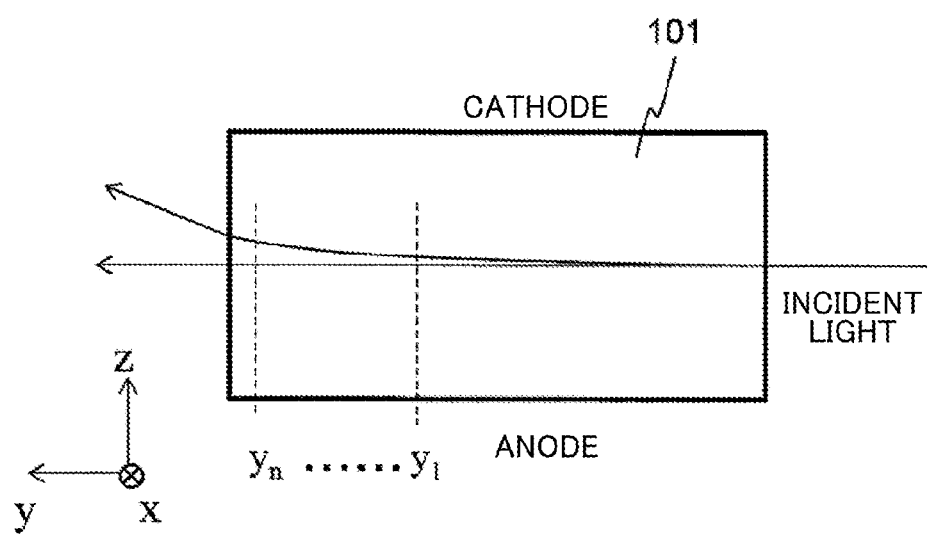
FIG. 2 is a diagram for describing an operating principle of the optical deflector according to the first embodiment of the present invention.

For example, as shown in FIG. 2, regarding a light beam that advances straight in the optical deflector 10 (deflection angle is 0°) and a light beam that is deflected to the cathode-side (deflection angle is a predetermined angle), if the charge density is constant in the voltage applying direction (z-direction) at y=y1, then the lens powers given to the respective light beams by the KTN crystal 101 are equal.

Similarly, if the charge density is constant in the voltage applying direction (z-direction) at y=yn, then the lens powers given to the respective light beams by the KTN crystal 101 are equal.

In this way, when the charge density is constant in the voltage applying direction (z-direction) at an arbitrary point (y=y1 to yn) in the optical axis direction of incident light in the KTN crystal 101, lens power becomes constant independent of a deflection angle and, as a result, a beam diameter of deflected light becomes constant independent of a deflection angle.

Control of Optical Deflector

As described above, in order to make the lens power of deflected light constant independent of a deflection angle, the charge density may be made constant in the voltage application direction (z-direction).

However, when an AC voltage superimposed with a DC bias is applied, the charge distribution in the KTN crystal 101 does not always become uniform. Since electrons are injected from the cathode, an absolute value of the charge density in the vicinity of the cathode tends to be larger than an absolute value of the charge density in the vicinity of the anode. In other words, the charge density does not become constant in the voltage application direction (z-direction) (refer to Japanese Patent Application Publication No. 2018-13775).

In consideration thereof, in order to control a spatial distribution of the charge density to be constant, there are a method of controlling a spatial distribution of a dielectric constant and a method of controlling a spatial distribution of a power density of excitation light 1.

In the former method, the spatial distribution of the dielectric constant is controlled by controlling the temperature of the KTN crystal 101. The dielectric constant can be reduced at a high temperature and the dielectric constant can be increased at a low temperature (refer to PTL 3).

In the latter method, when the KTN crystal 101 is irradiated with the excitation light 1 in a state where electric charges are accumulated in the KTN crystal 101, the electric charges are excited to a conduction band and discharged to the outside of the KTN crystal 101, and an absolute value of the charge density in the KTN crystal 101 is reduced. The higher the power density of the excitation light 1, the higher a ratio of decrease. In other words, if the power density of the excitation light 1 is increased near the cathode and reduced near the anode, the charge density in the KTN crystal 101 can be brought close to a uniform distribution.

In this manner, in order to realize a uniform distribution of the charge density, a condition which reduces an instantaneous voltage dependency of the beam diameter should be adopted as an optimization condition, by adjusting the spatial distribution of the dielectric constant and the spatial distribution of the power density of the excitation light 1. However, since there are many combinations of a control condition of the spatial distribution of the dielectric constant and a control condition of the spatial distribution of the power density of the excitation light 1, it is difficult to optimize control conditions by combining the control conditions.

In consideration thereof, after the spatial distribution of the power density of the excitation light 1 is made constant at a certain value in the voltage application direction (z-direction), the spatial distribution of the dielectric constant is controlled (changed), and a beam diameter is evaluated by each instantaneous value of the driving voltage. Further, the spatial distribution of the power density of the excitation light 1 is made constant at another value in the voltage application direction (z-direction), the spatial distribution of the dielectric constant is controlled (changed), and the beam diameter is evaluated by each instantaneous value of the driving voltage. Accordingly, since the power density becomes the only set value of the excitation light 1 in the optimization of the control condition and the number of set values (number of settings) can be reduced, the optimization can be efficiently performed.

Figure 3A:
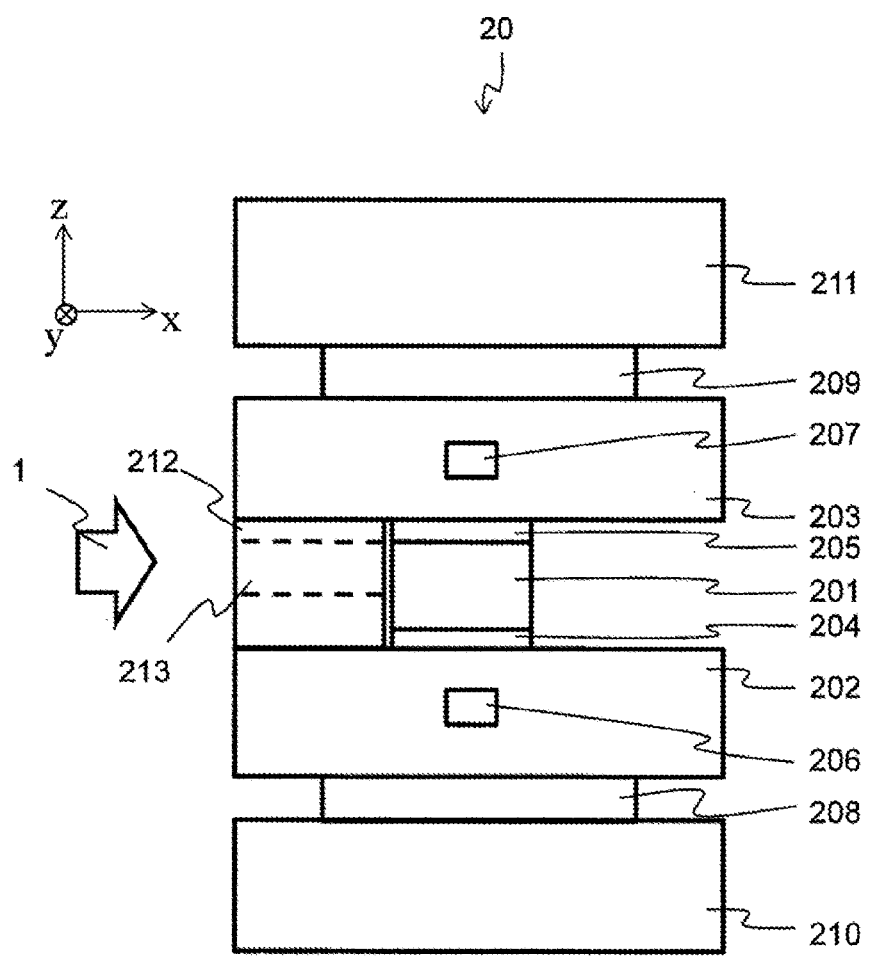
FIG. 3A is a front view showing a configuration of an optical deflector according to a comparative example of the first embodiment of the present invention.
Figure 3B:
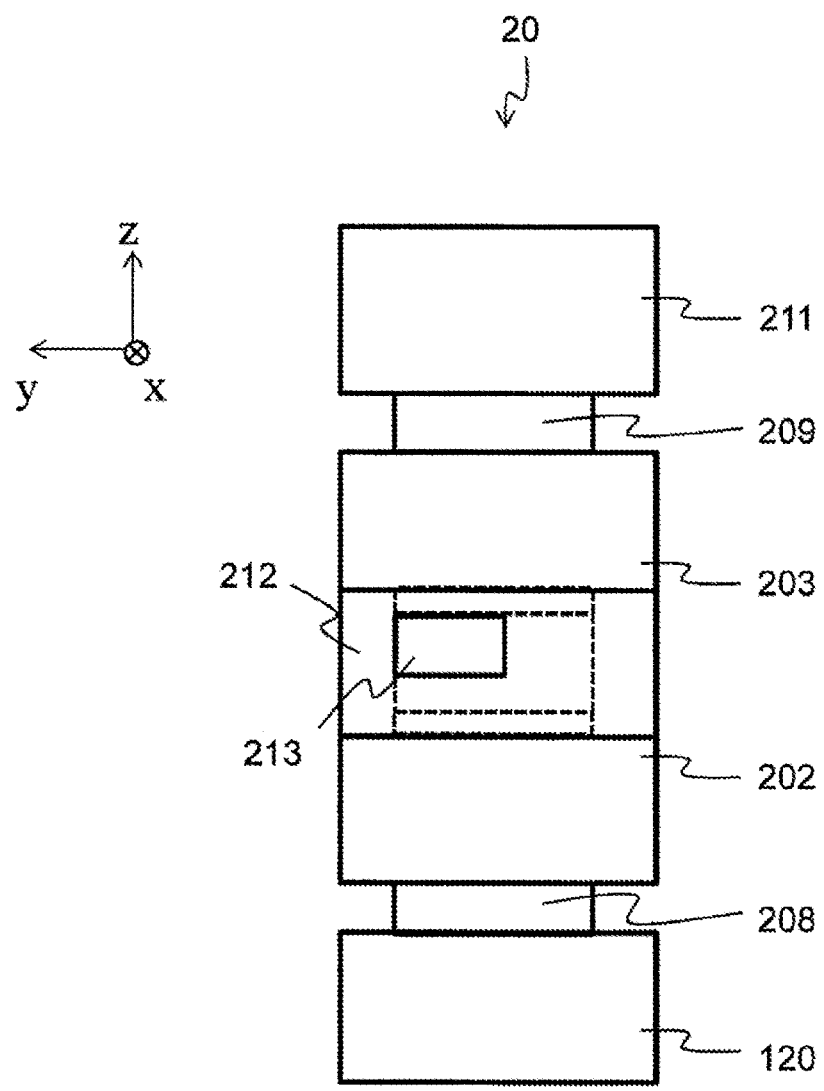
FIG. 3B is a side view showing a configuration of the optical deflector according to the comparative example of the first embodiment of the present invention.

FIGS. 3A and 3B show a comparative example of an optical deflector 20 according to the present embodiment. In the comparative example, the length of a hole 213 through which the excitation light 1 is transmitted in the voltage application direction (z-direction) is shorter than the thickness of a KTN crystal 201 (z-direction). As a result, the power density of the excitation light 1 applied to the KTN crystal 201 is dependent on the z-direction and the excitation light 1 is not uniformly radiated in the z-direction.

On the other hand, in the optical deflector 10 according to the present embodiment, as shown in FIGS. 1A and 1B, the length of the hole through which the excitation light 1 is transmitted in the voltage application direction (z-direction) is equal to or longer than the thickness of the KTN crystal 101 (z-direction). As a result, the power density of the excitation light 1 applied to the KTN crystal 101 does not depend on a z-coordinate and the excitation light 1 is uniformly radiated in the z-direction.

First Modification

Figure 4:
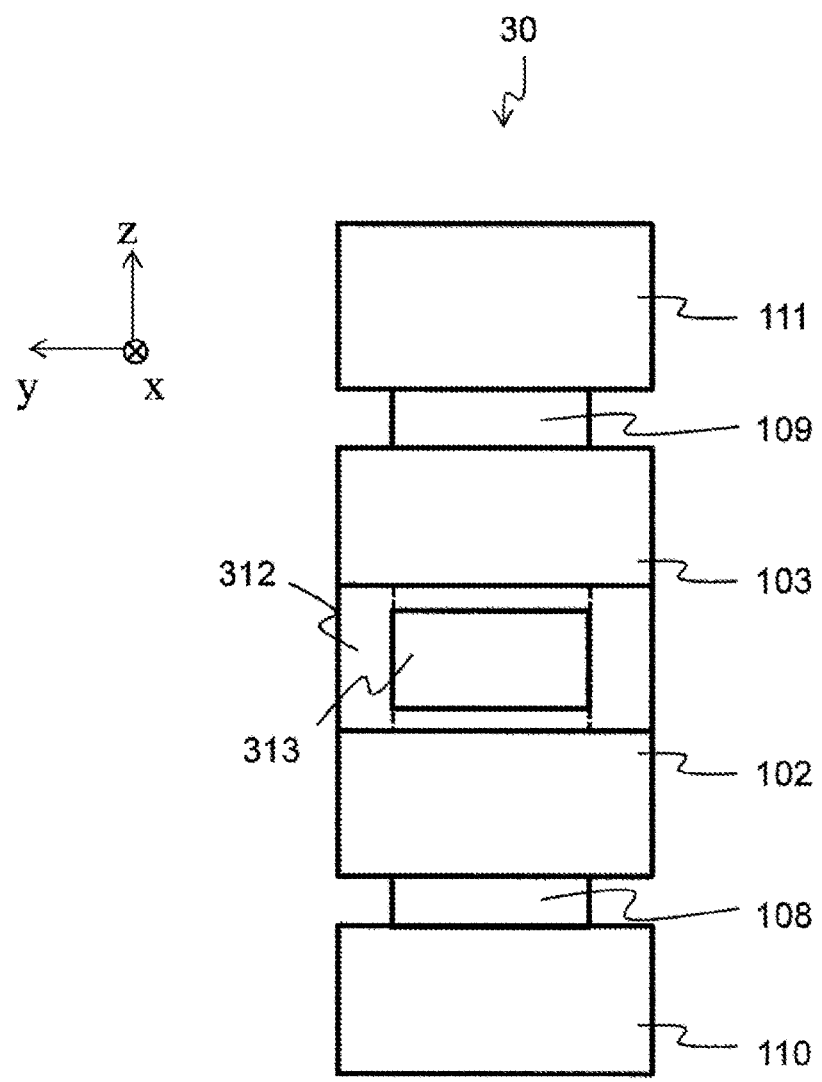
FIG. 4 is a side view showing a configuration of an optical deflector according to a first modification of the first embodiment of the present invention.

As shown in FIG. 4, an optical deflector 30 according to a first modification of the present embodiment has substantially the same configuration as that of the first embodiment, but the shape of the hole through which the excitation light 1 is transmitted in the insulator is different. In this case, the optical axis of transmitted light is parallel to the y-axis.

In the optical deflector 30 according to the present modification, the length of a hole 313 in the direction of the optical axis of the incident light (y-direction) is equal to or longer than the length of a KTN crystal 301 (y-direction). In addition, the length of the hole 313 in the voltage application direction (z-direction) is equal to or larger than the thickness of the KTN crystal 101 (z-direction).

As a result, the power density of the excitation light 1 applied to the KTN crystal 301 does not depend on a z-coordinate and the excitation light 1 is uniformly radiated in the z-direction.

Second Modification

Figure 5:
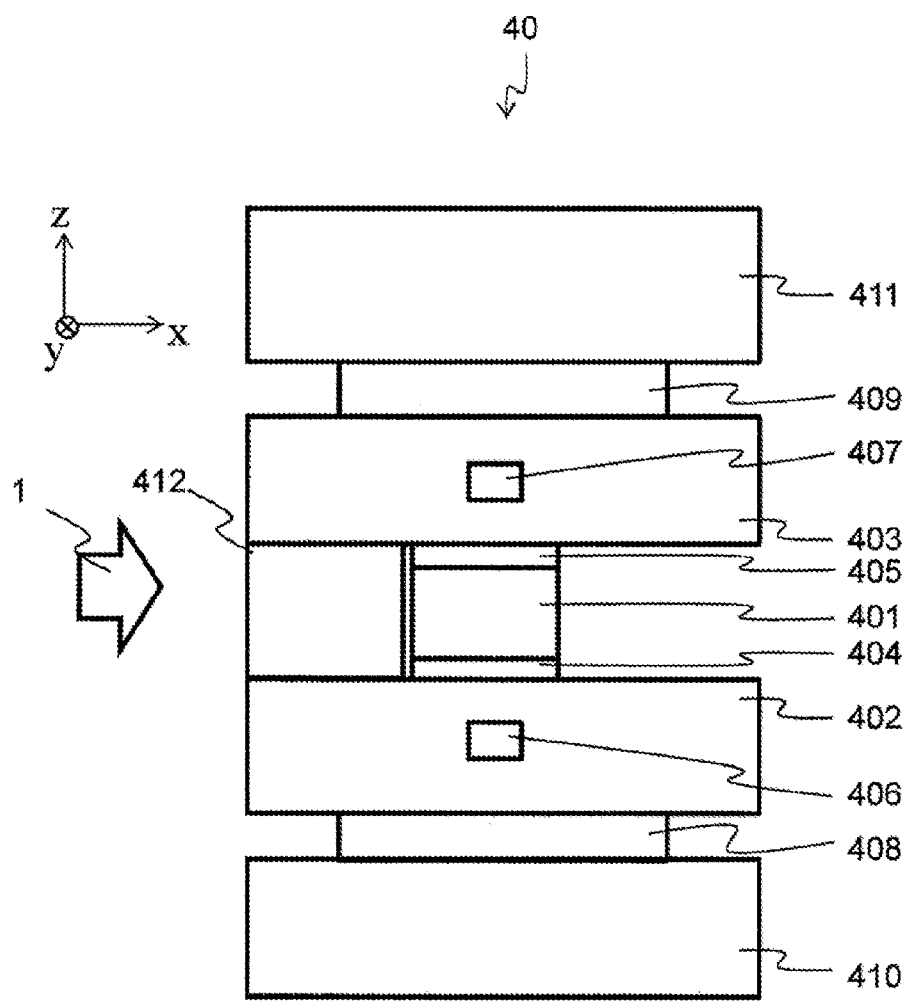
FIG. 5 is a front view showing a configuration of an optical deflector according to a second modification of the first embodiment of the present invention.

As shown in FIG. 5, an optical deflector 40 according to a second modification of the present embodiment has substantially the same configuration as that of the first embodiment, but differs from that of the first embodiment in an insulator. In this case, the optical axis of transmitted light is parallel to the y-axis.

In the optical deflector 40 according to the present modification, an insulator 412 is transparent with respect to the excitation light 1 emitted from the excitation light source. In this case, "transparent" includes transmittance being 100% and having finite transmittance that enables enough optical power to excite electrons trapped in the KTN crystal 101 to be transmitted.

As a result, a KTN crystal 401 can be irradiated with the excitation light 1 without forming a hole for passing the irradiation light through the insulator 412.

Third Modification

An optical deflector according to a third modification of the present embodiment is created by removing the insulator 412 from the optical deflector 40 according to the second modification of the present embodiment shown in FIG. 5. A difference from the conventional optical deflector 90 is that the excitation light 1 has a uniform intensity in the z-direction. The optical deflector according to the present modification has a similar effect to the optical deflector according to the first embodiment.

First Example

Figure 6:
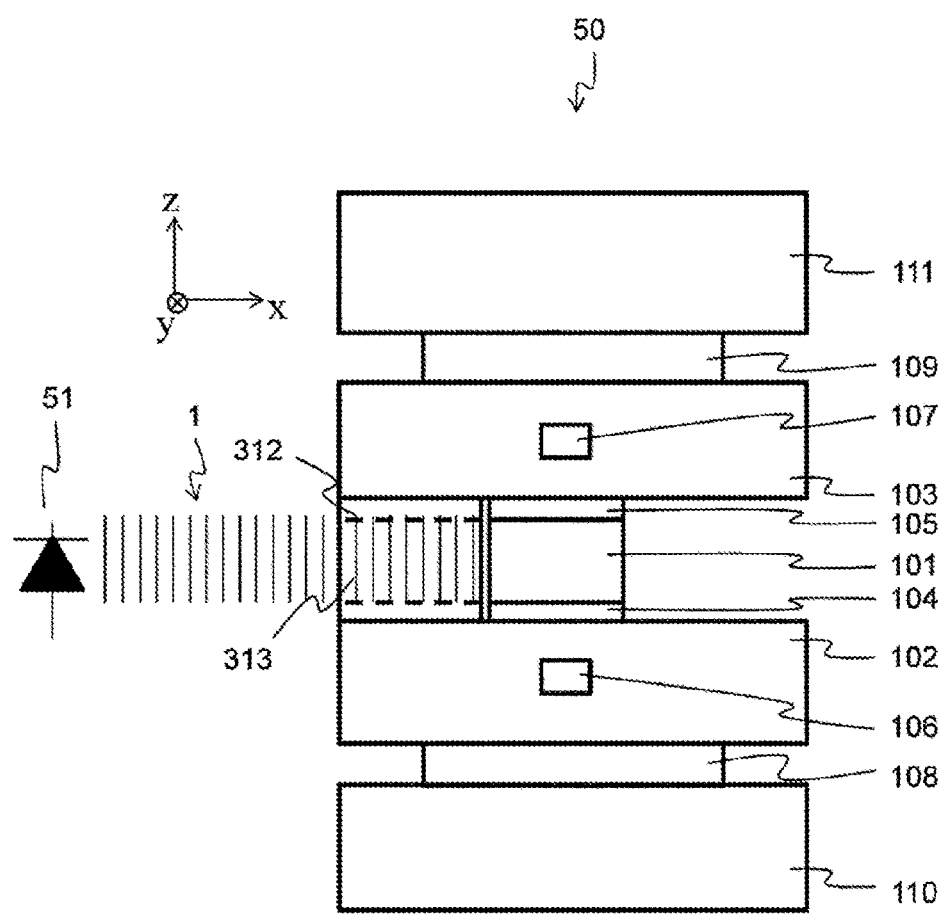
FIG. 6 is a front view showing a configuration of an optical deflector according to a first example of an embodiment of the present invention.

As shown in FIG. 6, an optical deflector 50 according to a first example of an embodiment of the present invention has substantially the same configuration as that of the first modification of the first embodiment and includes an excitation light source 51.

First, in order to control a spatial distribution of power density of the excitation light, in the optical deflector 50, the excitation light source 51 outputs a plane wave and the KTN crystal 101 is irradiated with the plane wave. As a result, the power density of the excitation light 1 applied to the KTN crystal 101 becomes constant in the z-direction and the y-direction.

Next, in order to control a spatial distribution of a dielectric constant, a temperature of the anode-side metal block 102 and a temperature of the cathode-side metal block 103 are respectively set to predetermined temperatures.

As described above, by evaluating instantaneous voltage dependency of a beam diameter by driving the optical deflector 50 while changing temperatures of the metal blocks 102 and 103 and making the power density of the excitation light 1 constant, an optimization condition for reducing the instantaneous voltage dependency of the beam diameter is determined.

Due to the optimization condition, the optical deflector 50 according to an embodiment of the present example can be driven while suppressing the instantaneous voltage dependency of the beam diameter.

Second Example

Figure 7:
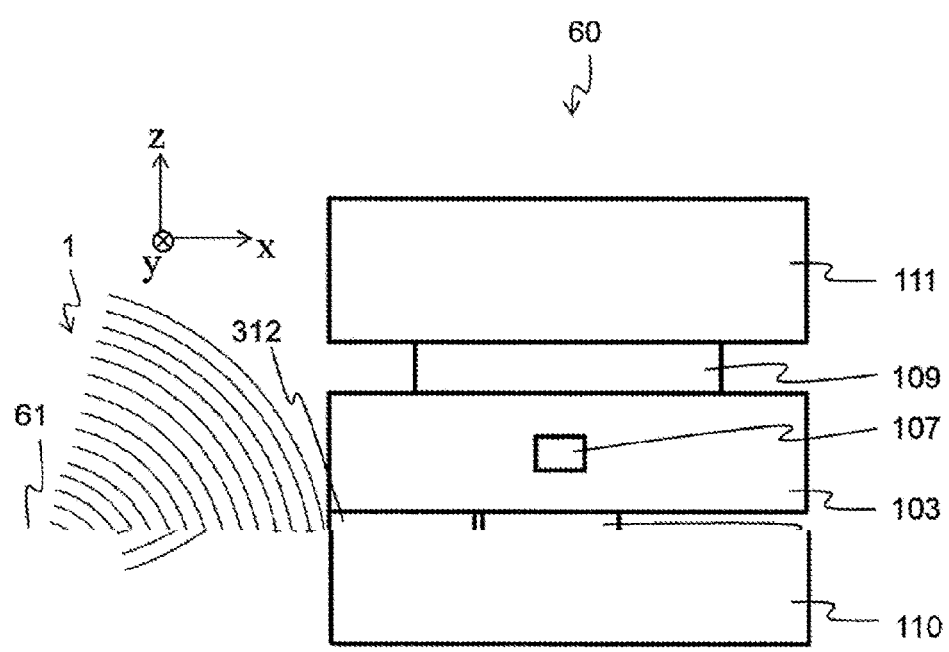
FIG. 7 is a front view showing a configuration of an optical deflector according to a second example of an embodiment of the present invention.

As shown in FIG. 7, an optical deflector 60 according to a second example of an embodiment of the present invention has substantially the same configuration as that of the first modification of the first embodiment and includes an excitation light source 61.

In order to control the spatial distribution of the power density of the excitation light 1, the excitation light source 61 outputs a spherical wave and the KTN crystal 101 is irradiated with the spherical wave.

Figure 8:
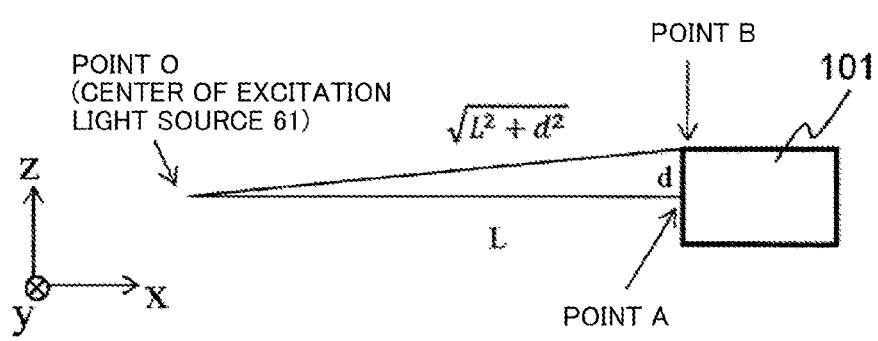
FIG. 8 is a diagram for describing excitation light in the optical deflector according to the second example of an embodiment of the present invention.

In FIG. 8, when a distance from the excitation light source 61 to the KTN crystal 101 is denoted by L (point O to point A) and a thickness of the KTN crystal 101 (z-direction) is denoted by 2d, a distance from the excitation light source 61 to an end (z-direction) of the KTN crystal 101 (point O to point B) is represented by $\sqrt{(L^2+d^2)}$.

Since the power density of light is inversely proportional to the square of the distance from a center of a light source, the power density of the excitation light 1 at the point A is proportional to $1/L^2$ and the power density of the excitation light 1 at the point B is proportional to $1/(L^2+d^2)$. For example, when L and d are respectively set to L=10 mm and d=1 mm, the power density of the excitation light 1 at the point A is proportional to $1/100$ and the power density of the excitation light 1 at the point B is proportional to $1/101$.

As a result, a difference in the power density of the excitation light 1 between the point A and the point B can be suppressed to about 1%, and the power density can be made almost equal.

As described above, by evaluating the instantaneous voltage dependency of the beam diameter by driving the optical deflector 60 while changing temperatures of metal blocks and making the power density of the excitation light 1 approximately uniform in the voltage application direction (z-direction), an optimization condition for reducing the instantaneous voltage dependency of the beam diameter is determined.

Due to the optimization condition, the optical deflector 60 according to the present example can be driven while suppressing the instantaneous voltage dependency of the beam diameter.

Third Example

An optical deflector according to a third example of an embodiment of the present invention has substantially the same configuration as that of the first modification of the first embodiment, and irradiates the KTN crystal 101 with excitation light 1 from an excitation light source.

Figure 9:
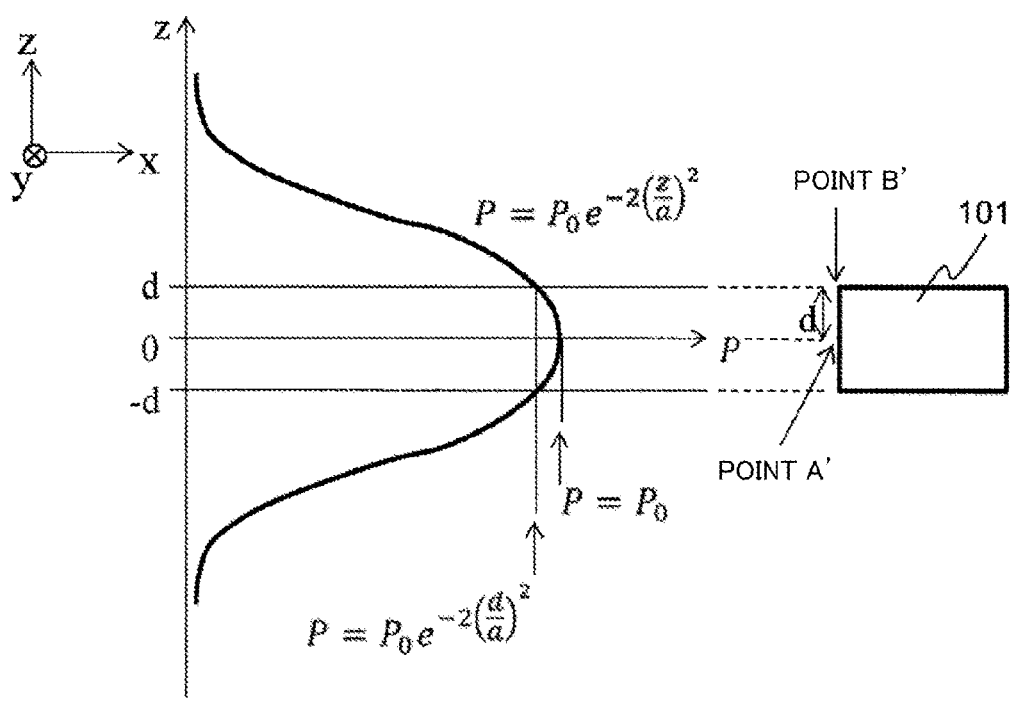
FIG. 9 is a diagram for describing excitation light in an optical deflector according to a third example of an embodiment of the present invention.

In the optical deflector according to the present example, as shown in FIG. 9, the KTN crystal 101 is irradiated with a Gaussian beam as excitation light.

A beam profile (a z-dependence of optical power density) in the KTN crystal 101 is assumed to be $P=P_o \exp[-2(z/a)^2]$, where $P_o$ denotes an optical power density of a peak and a denotes a radius at which the optical power density becomes $1/e^2$ as compared with the peak. The thickness of the KTN crystal 101 (z-direction) is denoted by 2d. When a=14 mm and d=1 mm, the optical power density of the KTN crystal 101 at an end (z-direction) (point B') is represented by $P=P_o \exp[-2(1/14)^2]=0.99P_o$.

In this manner, a difference from the optical power density $P_o$ at a center (point A') can be suppressed to about 1% and the power density can be made almost equal.

As described above, by evaluating the instantaneous voltage dependency of the beam diameter by driving the optical deflector while changing temperatures of metal blocks and making the power density of the excitation light 1 approximately uniform in the voltage application direction (z-direction), an optimization condition for reducing the instantaneous voltage dependency of the beam diameter is determined.

Due to the optimization condition, the optical deflector according to the present example can be driven while suppressing the instantaneous voltage dependency of the beam diameter.

Fourth Example

Figure 10:
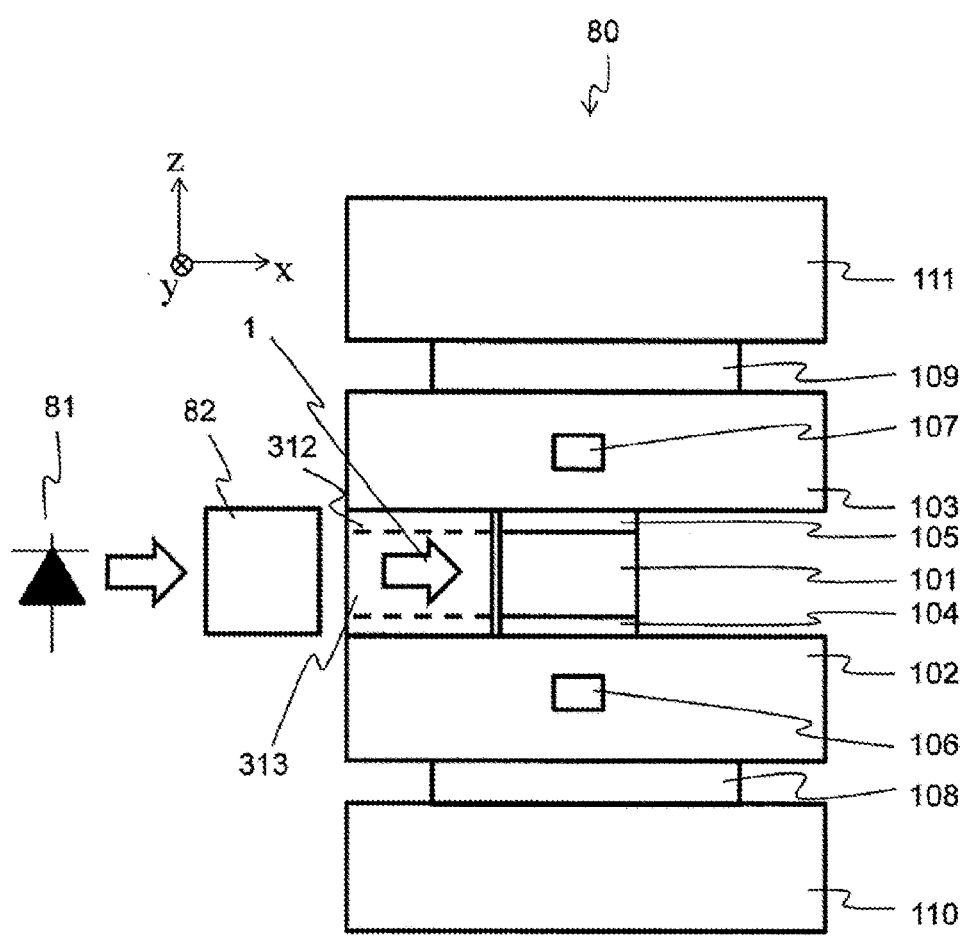
FIG. 10 is a front view showing a configuration of an optical deflector according to a fourth example of an embodiment of the present invention.

As shown in FIG. 10, an optical deflector 80 according to a fourth example of an embodiment of the present invention has substantially the same configuration as that of the first modification of the first embodiment and includes a homogenizer 821 between the excitation light source and the KTN crystal 101.

The homogenizer 821 is an optical element for converting the input excitation light 1 into excitation light 1 of which an optical power density is spatially uniform.

Figure 11:
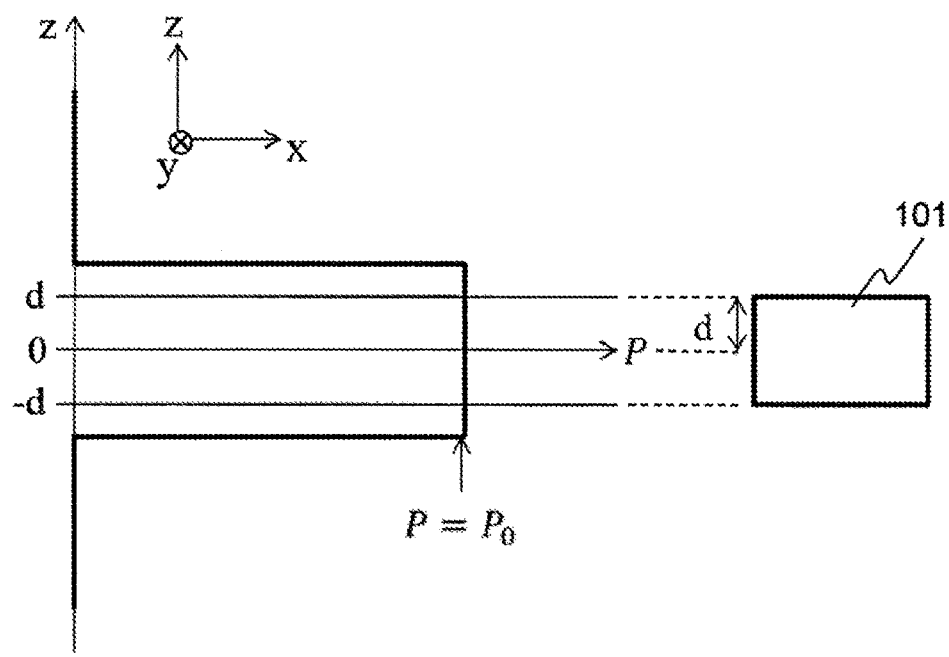
FIG. 11 is a diagram for describing excitation light in the optical deflector according to the fourth example of an embodiment of the present invention.

As shown in FIG. 11, a range in the z-direction where the power density of the excitation light 1 becomes uniform is equal to or more than the thickness 2d of the KTN crystal 101 (z-direction). Therefore, the KTN crystal 101 is uniformly irradiated with the excitation light 1 in the z-direction.

As described above, by evaluating the instantaneous voltage dependency of the beam diameter by driving the optical deflector 80 while changing temperatures of metal blocks and making the power density of the excitation light 1 uniform, an optimization condition for reducing the instantaneous voltage dependency of the beam diameter is determined.

Due to the optimization condition, the optical deflector 80 according to the present example can be driven while suppressing the instantaneous voltage dependency of the beam diameter.

Fifth Example

In the present example, an example of determination of a control condition in the optical deflector 10 according to the first embodiment will be described.

In the optical deflector according to the third modification of the first embodiment, a KTN crystal 101 having an electrode interval of 2 mm is used as the KTN crystal 101. The KTN crystal 101 has a rectangular parallelepiped shape and a size thereof is 4.0 (y-direction)×3.2 (x-direction)×2.0 (z-direction) mm³.

An electrode film made up of Ti/Pt/Au was deposited on a 4.0×3.2 mm² surface.

The temperature of the anode-side metal block 102 was set to 37.58° C. Here, when the temperature of the cathode-side metal block 103 is set to be the same 37.58° C., a relative dielectric constant of the KTN crystal 101 was 17500.

When evaluating characteristics of the optical deflector, 39.58° C., 39.73° C., 39.88° C., and 40.58° C. were selected as temperatures of the cathode-side metal block 103.

Moreover, 1.2 mW, 2.4 mW, 3.6 mW, 6 mW, 12 mW, and 18 mW were selected as the power of the excitation light source.

A sine wave voltage having a DC bias of −400 V, an amplitude of 285 V, and a frequency of 1 kHz was applied under irradiation with excitation light 1 (peak wavelength: 400 nm), incident light (wavelength: 1.06 μm) was deflected, and an instantaneous voltage dependence of a beam diameter of deflected light was evaluated. When the temperature of the cathode-side metal block 103 was set to 39.88° C., that is, 2.3° C. higher than the temperature of the anode-side metal block 102 and the power of the excitation light source was set to 6 mW, it was confirmed that the dispersion of the beam diameter (=maximum beam diameter−minimum beam diameter/average beam diameter) is within 6.5%.

In this manner, by optimizing control conditions of the spatial distribution of the dielectric constant and the power density of the excitation light 1, the optical deflector 10 according to the present example can be driven while suppressing the instantaneous voltage dependency of the beam diameter.

As the excitation light 1 according to an embodiment of the present invention, it is desirable to use ultraviolet light to violet light. Particularly, light having a center wavelength of 400 nm to 405 nm is desirable.

In the optical deflector according to an embodiment of the present invention, although an example in which an insulator is disposed on a side of one side surface of a KTN crystal has been shown with the exception of the third modification, a similar effect can be obtained without disposing an insulator.

Figure 12:
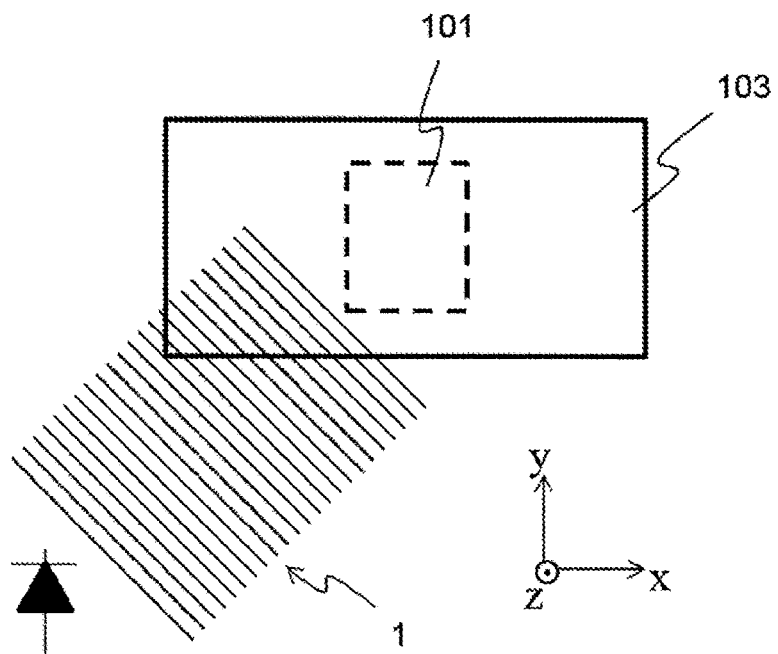
FIG. 12 is a top view for describing an optical deflector according to an embodiment of the present invention.
Figure 13:
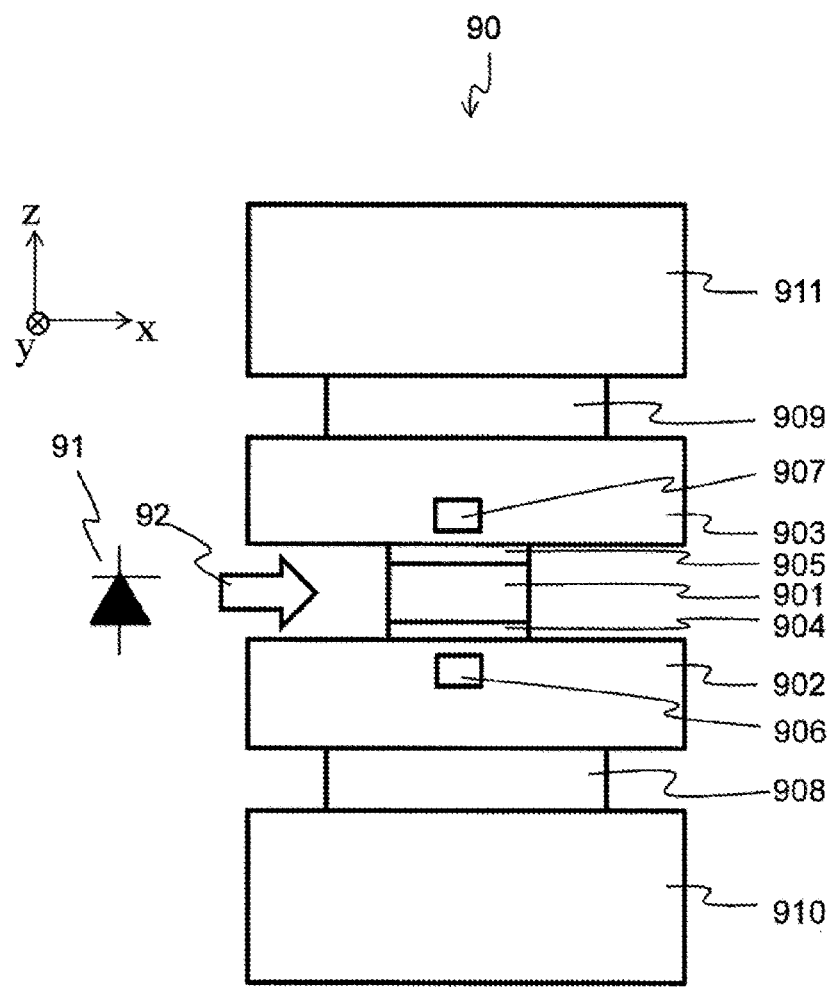
FIG. 13 is a front view showing a configuration of a conventional optical deflector.

In the optical deflector according to an embodiment of the present invention, while an example in which a direction of travel of excitation light is the x-direction and one side surface of the KTN crystal is irradiated with the excitation light has been shown, the irradiated surface may be an incident surface or an emitting surface of deflected light. Further, as in the top view of the optical deflector shown in FIG. 12, both the side surface and the incident surface may be used.

In the optical deflector according to an embodiment of the present invention, while an example in which the insulator is disposed only on a side of one side surface of the KTN crystal has been shown, the insulator may be disposed on the sides of both side surfaces of the KTN crystal. In particular, when the length of the hole 113 in the optical axis direction of the incident light (y-direction) is shorter than the length of the KTN crystal 101 (y-direction) as in the case of the insulator 112 shown in FIG. 1B, since the KTN crystal 101 and the insulator 112 come into contact with each other, the KTN crystal can be fixed at a predetermined position by sandwiching the KTN crystal with insulators from the sides of both side surfaces of the KTN crystal.

In an embodiment of the present invention, while an example in which the KTN crystal 101 ($KTa_{1-x}Nb_xO_3$) is used as an electro-optic material has been shown, a KLTN ($K_{1-y}Li_yTa_{1-x}Nb_xO_3$) crystal created by adding lithium to the KTN crystal 101 may be used, and any electro-optic material may be used as long as the electro-optic material is in a paraelectric phase and has a trap for storing charges therein, where $0<x<1$ and $0<y<1$.

Although examples of structures, dimensions, materials, and the like of each component in configurations, manufacturing methods, and the like of an optical deflector have been shown in the described embodiments of the present invention, the present invention is not limited thereto. Any optical deflector may be used as long as functions and effects thereof can be exhibited.

Industrial Applicability

Embodiments of the present invention can be applied to various optical devices such as a laser printer and a wavelength-swept light source.

The invention claimed is:

1. An optical deflector comprising:
a first temperature control element;
a first conductor component on the first temperature control element, the first conductor component having a first set predetermined temperature;
a first sensor on the first conductor component;
a dielectric element in a paraelectric phase on the first conductor component and configured to:
deflect light transmitting in a first direction therethrough; and
be irradiated with an excitation light having a substantially uniform intensity in a second direction perpendicular to the first direction;
a second conductor component on the dielectric element, the second conductor component having a second set predetermined temperature, wherein the first conductor component and the second conductor component are configured to apply a voltage to the dielectric element in the second direction, and wherein the light transmitting through the dielectric element is deflected according to the application of the voltage;
a second sensor on the second conductor component; and
a second temperature control element on the second conductor component.

2. The optical deflector according to claim 1, further comprising an insulator on a side of the dielectric element.

3. The optical deflector according to claim 2, wherein:
the insulator has a hole in a direction perpendicular to the second direction; and
a length of the hole in the second direction is equal to or longer than a length of the dielectric element in the second direction and shorter than a length of the insulator in the second direction.

4. The optical deflector according to claim 2, wherein the dielectric element and the insulator are in physical contact with each other.

5. The optical deflector according to claim 2, wherein the insulator is transparent with respect to the excitation light.

6. The optical deflector according to claim 1, further comprising:
a drive power supply configured to apply the voltage between the first conductor component and the second conductor component;
an excitation light source configured to emit the excitation light; and
a temperature control circuit connected to the first sensor, the second sensor, the first temperature control element, and the second temperature control element.

7. The optical deflector according to claim 6, further comprising a homogenizer between the excitation light source and the dielectric element.

8. A method for determining a control condition of an optical deflector, wherein the optical deflector comprises a first temperature control element, a first conductor component on the first temperature control element and on which a first sensor is disposed, a dielectric element in a paraelectric phase on the first conductor component and configured to deflect light transmitting therethrough in a first direction, a second conductor component on the dielectric element and on which a second sensor is disposed, and a second temperature control element on the second conductor component, the method comprising:
irradiating the dielectric element with an excitation light having a substantially uniform intensity in a second direction perpendicular to the first direction;
setting a temperature of the first conductor component and a temperature of the second conductor component to predetermined temperatures;
applying a voltage between the first conductor component and the second conductor component;
measuring a beam diameter of emitted light of the optical deflector; and
resetting the temperature of the first conductor component and the temperature of the second conductor component such that a variation of the beam diameter due to instantaneous voltage dependency becomes equal to or less than a predetermined value.

9. A method of providing an optical deflector, the method comprising:
providing a first temperature control element;
providing a first conductor component on the first temperature control element, the first conductor component having a first set predetermined temperature;
providing a first sensor on the first conductor component;
providing a dielectric element in a paraelectric phase on the first conductor component, wherein the dielectric element deflects light transmitting in a first direction therethrough and is irradiated with an excitation light having a substantially uniform intensity in a second direction perpendicular to the first direction;
providing a second conductor component on the dielectric element, the second conductor component having a second set predetermined temperature, wherein the first conductor component and the second conductor component apply a voltage to the dielectric element in the second direction, and wherein the light transmitting through the dielectric element is deflected according to the application of the voltage;
providing a second sensor on the second conductor component; and
providing a second temperature control element on the second conductor component.

10. The method according to claim 9, further comprising providing an insulator on a side of the dielectric element.

11. The method according to claim 10, wherein:
the insulator has a hole in a direction perpendicular to the second direction; and
a length of the hole in the second direction is equal to or longer than a length of the dielectric element in the second direction and shorter than a length of the insulator in the second direction.

12. The method according to claim 10, wherein the dielectric element and the insulator are in physical contact with each other.

13. The method according to claim 10, wherein the insulator is transparent with respect to the excitation light.

14. The method according to claim 9, further comprising:
providing a drive power supply between the first conductor component and the second conductor component to apply the voltage;
providing an excitation light source that emits the excitation light; and
connecting a temperature control circuit to the first sensor, the second sensor, the first temperature control element, and the second temperature control element.

15. The method according to claim 14, further comprising providing a homogenizer between the excitation light source and the dielectric element.

* * * * *